United States Patent [19]

Holst et al.

[11] 4,337,328

[45] Jun. 29, 1982

[54] ACRYLIC POLYMERS HAVING A HIGH SWELLABILITY IN WATER

[75] Inventors: Arno Holst, Wiesbaden; Eberhard Perplies, Walluf; Gerhard Buchberger, Wiesbaden, all of Fed. Rep. of Germany

[73] Assignee: Hoechst Aktiengesellschaft, Fed. Rep. of Germany

[21] Appl. No.: 240,440

[22] Filed: Mar. 4, 1981

Related U.S. Application Data

[63] Continuation of Ser. No. 115,495, Jan. 25, 1980, abandoned.

[30] Foreign Application Priority Data

Jan. 29, 1979 [DE] Fed. Rep. of Germany ....... 2903267

[51] Int. Cl.$^3$ .............................................. C08F 8/12
[52] U.S. Cl. ................................... 525/336; 525/369; 525/378
[58] Field of Search ...................... 525/369, 336, 378

[56] References Cited

U.S. PATENT DOCUMENTS

| 2,812,317 | 11/1957 | Barrett | 525/369 |
| 2,861,059 | 11/1958 | Mowry | 525/369 |
| 3,850,898 | 11/1974 | Ide et al. | 525/369 |

FOREIGN PATENT DOCUMENTS

| 772734 | 4/1957 | United Kingdom | 525/369 |
| 848368 | 9/1960 | United Kingdom | 525/369 |

*Primary Examiner*—William F. Hamrock
*Attorney, Agent, or Firm*—James E. Bryan

[57] ABSTRACT

This invention relates to a process for the preparation of acrylic polymers which are at least for the most part insoluble in water and have a high swellability in water, by reacting polyacrylonitrile or copolymers based on acrylonitrile at a temperature exceeding 100° C. with aqueous-alkaline solutions which may contain an organic solvent which is miscible with water.

6 Claims, No Drawings

ACRYLIC POLYMERS HAVING A HIGH SWELLABILITY IN WATER

This is a continuation of application Ser. No. 115,495, filed Jan. 25, 1980 now abandoned.

The present invention relates to a process for the preparation of acrylic polymers from polyacrylonitrile under reaction conditions which lead to a reaction product which is at least for the most part insoluble in water and has a high swellability in water; the invention also relates to the use of the acrylic polymers so prepared.

Polyacrylonitrile fibers or polyacrylonitriles in the form of powders or granules may be called hydrophobic polymers, because water molecules do not cause them to swell at all or cause them to swell to a negligible degree only. Therefore, many attempts have been made to modify polyacrylonitrile polymers by changing their chemical structure—in particular by chemical reaction on the nitrile group—or by changing their physical structure—in particular by producing voids or gaps in the polymer structure or polymer build-up—with a view to producing polymers of improved hydrophilic properties.

Basically, three process variants have become known for the intended modification of the chemical structure:

A: Reaction of polyacrylonitrile with alkaline reactants (hydrolysis) to form polyacrylamide, polyacrylic acid, or polyacrylonitrile or polyacrylamide which are partially hydrolyzed, or corresponding copolymers; in general, the reaction products are intended to be soluble in water.

B: Preparation of modified types of the water-soluble products which may be prepared as described under A above, by causing acrylamide and/or acrylic acid to react with bifunctional compounds (cross-linking agents) according to copolymerization techniques; by converting polyacrylamide, polyacrylic acid, partially hydrolyzed polyacrylonitrile and/or polyacrylamide to salts; or by cross-linking these polymers; it is also possible to obtain reaction products which are water-insoluble and swellable, but these usually have an absorption rate which is too slow.

C: Chemical modification of at least some of the nitrile groups by particular reactive compounds and subsequent hydrolysis or partial hydrolysis of the intermediate products; the reaction products also may be swellable, however, the additional modification step is necessary.

Detailed descriptions of these process variants are especially contained in the following publications:

Houben-Weyl, "Methoden der organischen Chemie" (Methods of Organic Chemistry), fourth edition, volume XIV/2, 1963, page 708 et seq. states that the hydrolysis of polyacrylonitrile with alkali hydroxides may be effected in an aqueous medium or in undiluted alcohols under standard pressure or in an autoclave; the products of hydrolysis carry carboxylate groups and, in addition, also carboxylic acid amide groups, and they are water-soluble. For hydrolysis, polyacrylonitrile powders may be used, as well as polyacrylonitrile fibers.

As may be gathered from the information given under the heading "Polyacrylamides" in "Water-Soluble Resins," edited by R. L. Davidson and M. Sittig, Reinhold Publishing Corporation, New York, 1962, page 153 et seq., polyacrylamides or the copolymers thereof, for example, based on acrylamide/acrylic acid, are normally soluble in cold water. Hydrolyzed or partially hydrolyzed polyacrylamides or acrylamide/acrylic acid copolymers may be rendered insoluble by an addition of trivalent cations (e.g. $Al^{3+}$). Alternative methods used for rendering polyacrylamide insoluble are: (a) heating to a temperature of 90° C. with NaOH for several hours and adding a trivalent cation, (b) reacting with glyoxal under alkaline conditions, (c) reacting with formaldehyde at a pH value from about 10.0 to 10.5 and subsequently treating with acids, free radicals or heating, or (d) heating with acetic anhydride for several minutes.

According to U.S. Pat. No. 3,229,769, cross-linked, water-insoluble, water-swellable polyacrylic derivatives are either salts of polyacrylic acid or of polyacrylic acid derivatives, which have been cross-linked by ionizing radiation; or they are polymers or copolymers having a basis of acrylamide or acrylic acid, which have been cross-linked by chemical cross-linking agents. It is stated that although water-soluble polyacrylic derivatives which have not been cross-linked have thickening properties, for example, when added to aqueous liquids, they are not suitable or only insufficiently suitable for use as swellable compounds.

French Pat. No. 1,389,274, describes a process for the preparation of cross-linked, partially hydrolyzed polyacrylamides, wherein (a) acrylamide is copolymerized with cross-linking agents and (b) from about 20 to 40% of the amide groups are hydrolyzed into carboxylate groups by the action of alkali hydroxide.

U.S. Pat. No. 2,810,716, discloses a process for the preparation of polymers which have been cross-linked by chemical cross-linking agents. In this process, suitable monomers, for example, acrylic acid or acrylamide, and corresponding derivatives are copolymerized with polyunsaturated compounds. The process is performed in the presence of copolymerization initiators, divalent inorganic ions, water, a suspension agent and, if necessary, an organic solvent, and it yields products which contain from 0.01 to 0.2% of the cross-linking, originally polyunsaturated compound and which are swellable.

In German Auslegeschrift No. 2,358,853 (corresponding to British Pat. No. 1,447,536) a process is described for the preparation of modified polyacrylic fibers from polyacrylonitrile, wherein (a) polyacrylonitrile or copolymers having a basis of polyacrylonitrile are treated with hydroxylamine at temperatures ranging from 70° C. to 110° C., until they contain at least 0.05 mmole per g of fibers of amidoxime groups, (b) these fibers are then hydrolyzed in an aqueous-alkaline solution until they contain from 4 to 10 mmole per g of fibers of carboxyl groups, and (c) during or after hydrolysis, at least 3 mmole per g of the carboxyl groups are converted to the Li, K, Na and/or $NH_4$ salt.

It is an object of the present invention to provide a process for the preparation of swellable polyacrylic derivatives, wherein polyacrylonitrile or copolymers having a basis of polyacrylonitrile can be converted by hydrolysis to swellable polyacrylic derivatives without the use of additional chemical cross-linking agents or chemical modifying agents of other kinds.

The invention is based upon the known process for the preparation of (water-soluble) acrylic polymers, by reacting polyacrylonitrile or copolymers based on acrylonitrile with aqueous-alkaline solutions which may contain an organic solvent which is miscible with water.

The process of the invention, however, results in acrylic polymers which are at least for the most part insoluble in water and highly swellable in water and it has the feature that the polymer is reacted at a temperature exceeding 100° C.

The expression "at least for the most part insoluble in water" is to be understood as meaning that more than 50% by weight, especially more than 80% by weight of the acrylic polymers prepared according to the invention are water-insoluble. These acrylic polymers swell when they interact with aqueous liquids, particularly liquids having a water content of more than 50% by weight, or with water molecules (for example water vapor) which otherwise come into contact with them. The acrylic polymers prepared according to the invention are either in the form of fibers having lengths ranging from about 0.01 to 200 mm, particularly from about 0.1 to 150 mm, or in the form of powders or granules.

Suitable starting materials for the process of the invention are homopolymers of acrylonitrile or copolymers of acrylonitrile which preferably contain at least 70% by weight of acrylonitrile. Particularly suitable copolymer components are vinyl monomers, for example, vinyl acetate, vinyl chloride, vinylidene chloride or vinyl bromide, acrylic acid or methacrylic acid and the esters thereof, acrylamide, methacrylamide, maleic acid, styrene or mixtures of these monomers. The starting material is preferably employed in the form of fibers. The condition of the fibers, for example, their size, cross-sectional shape or configuration of the polymers, can be adjusted to the objective desired in each case. The fibers used may be in the form of staple fibers, cables, fiber strands, yarns or textiles. However, if yarns or textiles of polyacrylonitrile or based on polyacrylonitrile are used, these are appropriately comprised of individual threads, in order to ensure an adequate reaction.

The hydrolysis of polyacrylonitrile or of the copolymers having a basis of acrylonitrile is performed in an aqueous-alkaline medium. As alkaline substances, the hydroxides, carbonates and hydrogen carbonates of lithium, potassium or sodium, for example, may be employed; for economical reasons, however, NaOH is nearly always used. The concentration of the aqueous solutions may vary within wide limits, appropriately, the concentration ranges from about 0.1 to 60% by weight. For carrying out the process of the invention, the following two alternatives particularly may be used:

Hydrolysis of the polyacrylonitrile in alkaline mixtures of water and an organic solvent at temperatures exceeding 100° C., under standard pressure.

Hydrolysis of the polyacrylonitrile in an alkaline-aqueous medium at temperatures exceeding 100° C., under superatmospheric pressure.

The first-mentioned embodiment of the process is carried out in an alkaline mixture of water and an organic solvent. The proportion of the organic solvent which is miscible with water is, as a rule, greater than the proportion of water in the mixture, and it amounts, for example, to from 5 to 20 parts by weight per part by weight of water. It is often sufficient to limit the proportion of water to the water content present in ready-mixed aqueous-alkaline solutions which may be used. As the organic solvent, a monovalent or polyvalent aliphatic or cycloaliphatic alcohol having a boiling point of at least 110° C. is preferably used. Suitable alcohols are, in particular, n-butanol (BP=118° C.), cyclohexanol (BP=161° C.), glycol (BP=197° C.) or glycerol (BP=290° C.). The temperature above 100° C. which is required according to the invention is then considered as being the final temperature of the reaction mixture, which is reached towards the end of the reaction period of, appropriately, 0.5 to 5 hours. The reaction period depends, among other things, upon the type of solvent used. The completion of the inventive chemical reaction of polyacrylonitrile or of copolymers having a basis of acrylonitrile into the acrylic polymers which are at least for the most part insoluble in water and have a high swellability in water may be recognized, for example, in the reaction of a fibrous starting material, by the change of color of the reaction mass, which turns from originally yellow into dark red, then again into a lighter red or yellow or becomes even colorless. The final product of the reaction may be in the form of fibers or a powder or it may be ground into a powder. If the reaction is stopped before complete chemical conversion has taken place (recognizable, for example, by the fact that the color has not yet changed from dark red into light yellow), products are obtained which, in most cases, still have inferior swelling properties. It is also possible to prolong the duration of hydrolysis, but this procedure is limited for economic reasons. In addition, a longer duration of hydrolysis, i.e., a hydrolysis which takes longer than is absolutely necessary for obtaining a good yield and a product having good properties, will rather negatively influence the property of swellability which is of importance in the present invention.

The second embodiment of the process is carried out in an alkaline-aqueous medium without the addition of an organic solvent, under superatmospheric pressure. The superatmospheric pressure must be chosen such that the reaction mixture reaches a temperature above 100° C., preferably above 115° C. The reaction is, appropriately, performed in an autoclave consisting of glass or metal. The reaction period depends, among others, upon the ratio "free gas volume above the reaction mixture: total volume of the reaction vessel," i.e. the larger the free gas volume, the sooner it can absorb the ammonia ($NH_3$) produced in the hydrolysis or, expressed in terms of reaction kinetics, the sooner one of the reaction products can be removed from the actual equilibrium in the liquid reaction mixture, so that the equilibrium is shifted to the product side (containing, among others, the acrylic polymer which is desired according to the invention). In this manner, the reaction periods can be reduced, for example, from about 1 hour to about 10 minutes. Generally, the reaction period is in the range from about 0.05 to 2 hours, depending upon the reaction conditions. As in the case of the first-mentioned embodiment of the process, the completion of the reaction according to the invention is also here recognizable by a corresponding series of color changes which can be easily observed, for example, in a glass autoclave.

The amount of alkali which must be employed depends, on the one hand, upon the kind of reaction performed, for example, a large proportion of an organic solvent and/or water in the reaction mixture requires also a large proportion of alkali, in order to obtain an economically justifiable reaction period; or (see above) the required alkali concentration can be influenced by shifting the equilibrium in the pressure vessel. On the other hand, the amount of alkali depends upon the reaction temperature, i.e., the higher the temperature, the lower the amount of alkali which is usually necessary.

Appropriately, the amount of alkali used is in the range from about 0.1 mole to 10 moles per mole of polyacrylonitrile (this mole specification relates to the polymer unit —$CH_2$—$CH(CN)$—). The concentration of alkali in the reaction mixture ranges from about 0.1 to 60% by weight.

The acrylic polymers prepared according to the invention exhibit a good absorptivity and swellability and they are also capable of retaining a sufficient quantity of the liquid absorbed. As compared with prior art products (cf. comparative tests), significant improvements are achieved. The polymers are neither decomposed by acids nor by alkaline substances, for example, at temperatures of up to about 60° C. Furthermore, especially the materials which are partially hydrolyzed by high-boiling alcohols exhibit a very high absorption of moisture (measured by analogy to DIN 53 304).

It is assumed that, after hydrolyzing under the conditions of the present invention, the polymer prepared also carries amide groups and carboxylate groups, in addition to the nitrile groups which were originally (i.e. prior to the reaction) exclusively present or were present in a major proportion. Because the proportions (DS) of the amide groups and carboxylate groups in the molecule (according to analytical results) are only in the range from about (minimum 0 and maximum 1, in each case) $DS_{amide}$: 0.05 to 0.20 and $DS_{carboxylate}$: 0.002 to 0.15, further intermolecular and/or intramolecular reactions are likely to have taken place, a fact which also would be reflected by the occurring color changes. In addition, physical changes may possibly also have been effected on the molecule. If the monomers copolymerized with the acrylonitrile show amide groups or ester groups, it may be presumed that carboxylate groups are formed from these functional groups also, under the hydrolyzing conditions of the present invention.

The products produced according to the invention may be particularly employed for absorbing and/or retaining aqueous liquids or moisture. Among these fields of application number, for example, the absorption of physiological fluids, such as urine, blood, perspiration, or saliva in infant care, feminine hygiene or in medical practices and hospitals. The polymers prepared according to the invention are used as the sole components of or as additives in the absorptive compositions used, for example, in tampons, sanitary pads, nonwoven fabrics, nappies or underblankets. On account of their extremely high absorption of moisture, the polymers prepared according to the invention furthermore may be used to improve the ability to absorb and to transmit water vapor of bonded nonwoven fabrics, self-supporting sheet-like polymer structures or coatings, which are of interest for various technical applications. These uses include the replacement, in particular, of leather or certain textiles, for example, in shoes (shoe uppers, linings, soles) bag goods, upholstery covers, outer garments ("leather" and all-weather garments), textiles and articles for domestic use (table cloths, window "leathers," wiping cloths) or covering materials (tent materials and tarpaulins).

The parameters used in the description and in the examples for characterizing the acrylic polymers prepared according to the invention or the products in the comparative examples are to be understood as meaning the following:

WRV: water retention value of the acrylic polymer in g of $H_2O$ measured against 1,600 times the acceleration due to gravity, relative to 100 g of its water-insoluble proportion; WRV is determined after immersing the sample in water;

WUA: water-insoluble proportion in the acrylic polymer in % by weight;

$SV_{NaCl}$: absorption capacity of the acrylic polymer in g of a 1% concentration aqueous NaCl solution which is absorbed by 100 g of the polymer;

DS: degree of substitution, relative to the number of substituents per unit of polymer (in the case of polyacrylonitrile DS is maximally 1).

COMPARATIVE EXAMPLE V 1

This comparative example is based on the specification given in Example 1 (product D) of German Auslegeschrift No. 2,358,853, i.e., 500 ml of an aqueous hydroxylamine sulfate solution (containing 30 g of sulfate per liter) are added to 10 g of short-cut (approximately 1 cm length) polyacrylonitrile fibers (copolymer of about 94% of acrylonitrile and about 6% of acrylic acid monomethyl ester), the pH value is adjusted to 8.5 by means of an aqueous NaOH solution and the mixture is refluxed for about 1 hour. The yellow fibers are separated from the liquid constituents and subjected to hydrolysis for two hours at 100° C. in 500 ml of an aqueous NaOH solution (containing 15 g of NaOH per liter). The liquid constituents are then separated and the fibers are immersed in an excess of 2 N aqueous hydrochloric acid. After the fibers have been separated from the liquid constituents and thoroughly washed, they are immersed in an aqueous $NH_3$ solution and, thus, the ammonium salt of the polymer is prepared. The reaction product is dried at a temperature of 60° C.

COMPARATIVE EXAMPLES V 2 and V 3

These comparative examples are based on Example 2 (products L and M) of German Auslegeschrift No. 2,358,853, i.e. in a modification of the specification given in Comparative Example V 1, the K salt and the Na salt of the polymer are prepared, by immersing the fibers in an aqueous NaOH solution or KOH solution, respectively, instead of using an aqueous $NH_3$ solution.

COMPARATIVE EXAMPLE V 4

This comparative example is based on Example 5 of German Auslegeschrift No. 2,358,853, i.e. 500 ml of an aqueous solution containing 40 g of hydroxylamine hydrochloride and 40 g of $Na_2HPO_4$ and having a pH value of about 7.1 are added to 10 g of short-cut polyacrylonitrile fibers (cf. V 1). The mixture is refluxed for about 2 hours. The fibers are then separated from the liquid constituents and subjected to hydrolysis for 45 minutes at 100° C. in 50 g of an aqueous $Na_2CO_3$ solution (containing 2 g of $Na_2CO_3$). The wet-swollen material is dried in a vacuum and is essentially in the form of a Na salt.

The polymers prepared in the comparative examples have a fibrous structure. They are brittle after drying and then can be ground into powders. When water is added to these products it is rapidly absorbed after a short swelling retardation. The measured results obtained with these products, which are known from the prior art, are listed in the table below.

TABLE

| Example | WUA | WRV | $SV_{NaCl}$ |
|---|---|---|---|
| V 1 | 98 | 2,700 | 1,400 |
| V 2 | 98 | 7,550 | 2,520 |
| V 3 | 96 | 4,200 | 2,560 |

TABLE-continued

| Example | WUA | WRV | SV$_{NaCl}$ |
|---|---|---|---|
| V 4 | 97 | 43 | 1,140 |

COMPARATIVE EXAMPLE V 5

A one-hour hydrolysis of polyacrylonitrile fibers (cf. V 1) in a 25% by weight aqueous NaOH solution at 100° C. leads to a superficial modification of the fibers only, i.e. only the upper layers of the fibers dissolve slowly in water after this hydrolysis, and a compact, obviously unchanged fiber core remains. Accordingly, the fibers having a slightly reduced strength, exhibit hydrophilic properties on their surfaces (accompanied by a yellow coloration); a swelling capacity is, however, not observed.

EXAMPLE 1

200 ml of n-butanol, 20 g of a 50% by weight aqueous NaOH solution and 10 g of water are filled in a glass vessel and heated to a temperature of 60° C. while stirring; then 5 g of short-cut polyacrylonitrile fibers are added (cf. V 1). The reaction mixture is refluxed for 30 minutes, 60 minutes and 90 minutes, respectively. Upon completion of the reaction, the reaction mixture has a temperature of 101° C. If cyclohexanol, glycol or glycerol are used instead of n-butanol, the respective temperatures of the reaction mixture are 110° C., 144° C., and 131° C. First, the fibers turn yellow, then dark red and finally light yellow to colorless. When the fibers have the last-mentioned coloration the reaction is, to a large extent, completed. Upon cooling of the reaction mixtures in each case, the liquid constituents are separated from the gel-like fiber mass. The more or less strongly hydrolyzed polyacrylonitrile fibers (depending upon the duration of hydrolysis) are stirred in 1 to 2 liters of water to produce a suspension. By cautiously adding an about 15 to 20% by weight concentration aqueous HCl solution to the suspension, it is possible to precipitate the free acid of the hydrolyzed acrylic polymer. Following separation of the liquid constituents, the fibrous acrylic polymer is caused to swell by adding a dilute aqueous NH$_3$ solution, and it is then flocked by slowly adding acetone. The resulting NH$_4$ salt may be readily separated from the liquid constituents and is dried at a temperature of 60° C. The product which is present in a form resembling cotton wool has the following characteristic features: WUA=98, WRV=4,000 to 12,000 (depending upon the duration of hydrolysis), SV$_{NaCl}$=3,000.

EXAMPLE 2

The procedure of Example 1 is repeated, but in this case 200 ml of glycerol, 16 g of an aqueous 50% by weight NaOH solution, 16 g of water and 5 g of the polyacrylonitrile fibers are used. The reaction mixture is heated to a temperature of about 130° C. during a period of 1.25 hours. The NH$_4$ salt obtained which is first in a fibrous form is dried and then ground into a powder having the following characteristic features: WUA=97, WRV=100,000, SV$_{NaCl}$=6,300.

EXAMPLE 3

In a glass autoclave which has a volume of 400 ml, 5 g of the polyacrylonitrile fibers are mixed with 200 g of a 20% by weight aqueous NaOH solution. The closed vessel is heated for about 1.25 hours at a temperature of 140° C. In the course of the reaction, the color changes described in Example 1 can be observed. After ventilating the autoclave, the reaction mixture is removed and suspended in water; it is then acidified with a dilute aqueous HCl solution and the solid constituents are separated from the liquid constituents. The acrylic polymer is caused to swell by adding a dilute aqueous NH$_3$ solution and is then flocked by adding acetone. The resulting NH$_4$ salt may be readily separated from the liquid constituents and is dried at a temperature of 60° C. The product which is in amorphous condition has the following characteristic features: WUA=99, WRV=53,000, and SV$_{NaCl}$=6,700.

EXAMPLE 4

10 g of the polyacrylonitrile fibers, 6 g of a 50% by weight aqueous NaOH solution and 500 g of water are mixed in a glass autoclave which has a volume of 1.5 liters and has been preheated with steam. The closed vessel is directly heated for about 10 minutes by means of superheated steam while, simultaneously, parts of the ammonia produced in the hydrolysis of the nitrile group are removed from the reaction mixture via an excess pressure valve. Following ventilation of the autoclave, the reaction mixture is drained and neutralized with acetic acid. The fibers are washed in water and dried. The Na salt which is present in a fibrous form has the following characteristic features: WUA=96, WRV=2,500, and SV$_{NaCl}$=1,920.

It will be obvious to those skilled in the art that many modifications may be made within the scope of the present invention without departing from the spirit thereof, and the invention includes all such modifications.

What is claimed is:

1. Acrylic polymers which are (a) more than 50 percent by weight insoluble in water, (b) have a high swellability in water, and (c) have degrees of substitution (DS) of DS$_{amide}$ from 0.05 to 0.20 and DS$_{carboxylate}$ from 0.002 to 0.15, said acrylic polymers being produced by reacting polyacrylonitrile or copolymers based on acrylonitrile with an aqueous-alkaline solution at a temperature exceeding 100° C.

2. Acrylic polymers as claimed in claim 1 produced in an aqueous-alkaline solution which contains an organic solvent which is miscible with water.

3. Acrylic polymers as claimed in claim 1 which are more than 80 percent by weight insoluble in water.

4. Acrylic polymers as claimed in claim 2 produced in an aqueous-alkaline solution which contains an alcohol selected from the group consisting of monovalent and polyvalent aliphatic and cycloaliphatic alcohols having a boiling point of at least 110° C.

5. Acrylic polymers as claimed in claim 4 produced in an aqueous-alkaline solution which contains an alcohol selected from the group consisting of n-butanol, cyclohexanol, glycol and glycerol.

6. Acrylic polymers as claimed in claim 1 produced by reacting said polymer or copolymer under superatmospheric pressure.

* * * * *